(12) United States Patent
Giamona et al.

(10) Patent No.: US 6,757,583 B2
(45) Date of Patent: Jun. 29, 2004

(54) INTERPOLATED MOTION CONTROL OVER A SERIAL NETWORK

(76) Inventors: Joe Giamona, 2523 291st Ave. NE., Carnation, WA (US) 98014; Larry Koler, 6330 Fauntleroy Way SW., Seattle, WA (US) 98136

( * ) Notice: Subject to any disclaimer, the term of this patent is extended or adjusted under 35 U.S.C. 154(b) by 0 days.

(21) Appl. No.: 10/186,074

(22) Filed: Jun. 27, 2002

(65) Prior Publication Data

US 2004/0002778 A1 Jan. 1, 2004

(51) Int. Cl.[7] .......................... G05B 19/41; G05B 19/24
(52) U.S. Cl. ....................... 700/189; 700/63; 700/252; 318/572; 318/573; 318/599
(58) Field of Search ................................ 700/186, 189, 700/250, 252; 318/568.15, 571, 573, 572, 599

(56) References Cited

U.S. PATENT DOCUMENTS

| | | | | |
|---|---|---|---|---|
| 3,725,651 A | * | 4/1973 | Cutler | 318/571 |
| RE30,132 E | | 10/1979 | Irie | 318/568 |
| 4,214,192 A | * | 7/1980 | Bromer et al. | 318/573 |
| 4,456,863 A | * | 6/1984 | Matusek | 318/572 |
| 4,581,698 A | * | 4/1986 | Jaswa | 700/189 |
| 4,593,366 A | * | 6/1986 | Sugimoto et al. | 700/262 |
| 5,394,323 A | * | 2/1995 | Yellowley et al. | 700/63 |
| 5,508,596 A | | 4/1996 | Olsen | 318/567 |
| 5,892,345 A | | 4/1999 | Olsen | 318/571 |
| 5,977,737 A | * | 11/1999 | Labriola, II | 318/599 |
| 5,988,850 A | * | 11/1999 | Kumiya | 700/63 |

* cited by examiner

Primary Examiner—Leo Picard
Assistant Examiner—Douglas S. Lee
(74) Attorney, Agent, or Firm—Liebler, Ivey&Connor; Floyd E. Ivey

(57) ABSTRACT

The invention provides a system for controlling motion in machine tools, industrial robots, and motion stages over a computer serial port. From a process or listing of coordinate data points which define the path of two (or more) servo axes, a computer outputs serial port data to distributed Control Modules which regulate an analog torque or velocity command signal to control each axes' servo drive in a manner that implements a precisely interpolated tool path. A digital I/O link is utilized to synchronize the initial serial port data stream and to compensate for the drift of the individual processor clocks within the separate Control Modules, thereby eliminating the need for network determinism and also reducing hardware costs.

11 Claims, 8 Drawing Sheets

INTERPOLATED MOTION CONTROL OVER A SERIAL NETWORK

CROSS-REFERENCE TO RELATED APPLICATIONS

U.S. Pat. No. 5,892,345 (Olsen), U.S. Pat. No. 5,508,596 (Olsen), U.S. Pat. No. Re. 30,132 (Irie)

FIELD OF THE INVENTION

The present invention relates generally to motion control, and, more particularly, the control of interpolated motion for machine tools, industrial robots, and motion stages using a network architecture.

BACKGROUND OF THE INVENTION

Motion control systems are well known in the art. They enable much of the automated manufacturing that exists today, especially for machine tools, industrial robots, and "Pick & Place" material handling systems. In general, they allow the precise rotational control of a servo motor which is coupled to a mechanical device that translates rotary motion into linear movement to facilitate the positioning of a work tool, another device, or product.

It is common for these types of systems to require interpolated motion, or coordinated and simultaneous motion of a plurality of servo motors (axes) which work together to move a tool, device, or product along a path defined within a three dimensional coordinate system.

The conventional state of the art system includes a central motion controller card which usually plugs into a computer bus adapter and processes a proprietary command set. Machine tool motion controllers, also known as Computer Numerical Controllers (CNC), are specialty computers with internal motion controller cards which process the RS-274D command set. There are also non-computer based multi-axis motion controllers, but, in general, they do not readily lend themselves to interpolated motion control at the level required for sophisticated machine tool processes.

Additional components of a motion control system typically include sensors, servo drives, servo motors, and encoders. The integration of these components with the central controller may easily require hundreds of feet of wire/cable and have hundreds of connection points. These large amounts of wire and numerous connection points increase the integration cost and decrease the reliability of a conventional motion control system.

To offer improved integration costs and system reliability, many controller manufacturers are providing alternative systems which distribute control over a network. The three dominate network protocols which support interpolated motion control are Sercos (IEC-61491), MACRO (Motion And Control Ring Optical), and Firewire (IEEE 1394). They are able to support interpolation because they are high bandwidth networks (up to 10 Mbit/sec) and implement deterministic network protocol. These require costly controller boards and specialized electronics within the servo drives. They do simplify integration and increase reliability, but suffer from increased component costs over the conventional approach. Additionally, the controllers are not compatible with the vast installed base of servo drives, so they do not provide an upgrade path, other then full system replacement.

There is a serial network protocol incorporated within all computers commonly known to as RS-232. This is a much slower network then those listed above and non-deterministic. When the serial output is distributed using the common RS-485 (multi-drop) parallel connection method, a bandwidth of approximately 115,200 bits/sec can be achieved. Therefore it has been used for utility or configuration purposes and non-interpolated motion sequencing. Accordingly, it would be desirable to provide a system and methodology which would enable this freely available serial network to be utilized for interpolated motion control. It would further be desirable that this system and methodology to be compatible with the existing installed base of machine tool servo drives and the low cost, commercially available, servo drive products having the standard analog signal control option.

U.S. Pat. No. Re. 30,132 (Irie) describes how a path to be followed by the point of a tool may be described as line segments specified by beginning and ending points. These beginning and ending points are input to a controller which interpolates all of the intermediate points on a real time basis and instructs the servo motors such that the point of the tool is commanded to pass though each of the intermediate points. An article by C. Wilson, "How Close Do You Have to Specify Points in a Contouring Application?", Motion Control, May 1993, relates how the modern controllers of today have become much more sophisticated since Irie. As described by Wilson, it is desirable to achieve more carefully tailored control of the motion of the tool then is possible by a single electronic circuit controller. To accommodate both the high travel rates and the ability to process typically 2,000 points per inch, a second circuit controller is used. The first acts as a course interpolation points generator and the second acts to add additional, or finer, points in between those points, the number of which is subject to the real time constraints of the process. Accordingly, it would be desirable to provide a system and methodology which would allow for "look ahead" and preprocessing of a portion of the path points by software and avoid the constraints of a real time system and the added cost of the resultant control electronics.

SUMMARY OF THE INVENTION

As shown in FIG. 6, the present invention controls a machine tool directly from the computer without add in cards by using a Control Module for each axis. The Control Module is attached near, or onto, each servo drive in the motion control system. Alternately, an embodiment of the invention can be incorporated within the servo drive as shown in FIG. 7 or within an integrated servo motor as shown in FIG. 8.

The Control Module may be developed using Digital Signal Processor (DSP) hardware. It is designed to communicate interactively with a computer via an RS232/RS485 network link to receive a control set point data stream. This data stream is generated by a Master Control program which resides in the computer's memory. The DSP, or alternative processor type, is equipped to receive quadrature encoder feedback data which is compared to the set point data stream. Using a common PID based algorithm, it continuously updates an analog output signal which is able to control almost any commercially available servo drive. An optional feature includes a further aspect: A voltage controlled oscillator coupled to the analog output could interface the Control Module to step motor drives which require a step and direction pulse stream to control motion.

A set point buffer within each Control Module accumulates a backlog of control set points in a queue which enables the invention to operate within a non-deterministic operating system environment, like Windows. The computer serial port feeds data to the buffer on an irregular, but continuous basis and the Control Module provides the necessary real time functionality to control the servo drive.

With this system it is possible to process any length file because the path can be converted to set point data while the previous set point commands are being acted upon. Conversely, it is possible to pre-process a file and then send data out to the buffer as it is required to support motion.

To accomplish these features, a Control Module interfaces each axis' servo drive to the computer via the RS-232 serial port which is connected using an RS-485 (multi-drop) network configuration. Each module has a unique address and ignores any information not having its' identifier appended to it. The Master Control Program resides in computer memory and reads in the file containing the path information selected by the operator. This file can be a standard RS-274D CNC program file, DXF drawing file, HPGL plotter file, operator generated points list, or alpha numeric ASCII text commands. The path geometry is translated by a Master Control Program function into coordinate positions, or set points, having a spacing dependant upon an operator specified chord height tolerance (path departure maximum). Elapsed time values are calculated and added to each set point command line to provide the Control Module with the information necessary for it to calculate the required velocity and acceleration to apply to the servo motor. The set point command line string is transmitted through the serial port to each axis sequentially.

To begin the actual motion in the synchronized manner required for interpolation, and thereby compensate for the non-determinism of the RS-485 network, a digital start/synchronization circuit is used. The Control Module specified as the master has a high speed digital output connected to the inputs on each of the other Control Modules in the network. When the operator initiates a start command, after at least two set points have been sent to the Control Modules' buffers, the start/synchronization circuit is strobed (on/off transition) by the master, causing all the axes to begin in precise unison. Any programmatic pauses in motion allow the individual Control Module internal clocks to be resynchronized with the master, again using the start/synchronization circuit. An embodiment of this invention could also maintain continuous path synchronization for an extended path length (or time) even if very inexpensive clocking electronics are utilized (which are more subject to non-determinate time drift) by strobing the start/synchronization circuit while motion is in process to re-synchronize the slaves' internal clocks to the masters' internal clock.

Another feature of the invention is that it provides a method in which existing motion control systems and machine tools can be retro fitted with the a network control methodology without the costly requirement of having to also replace the servo drives, as would be required if using the existing embodiments of the art. The savings can approach $8000 in a typical system.

DETAILED DESCRIPTION

Figure 6:
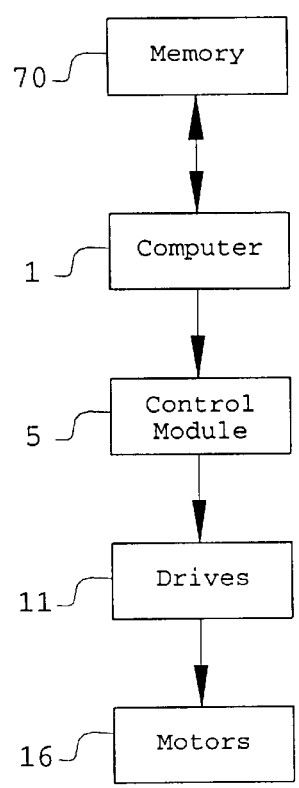
FIG. 6 shows the embodiment of the invention having a "stand alone" Control Module.
Figure 7:
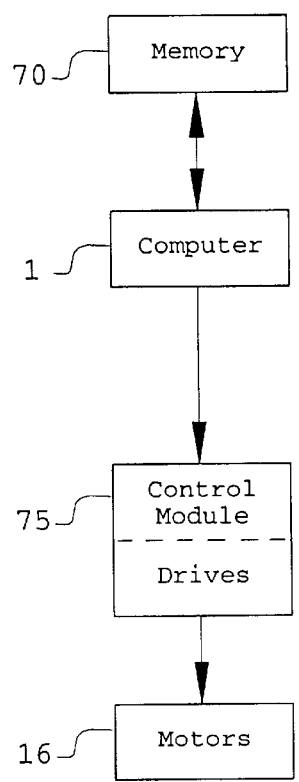
FIG. 7 shows the embodiment of the invention having the Control Module integral with the servo drive.
Figure 8:
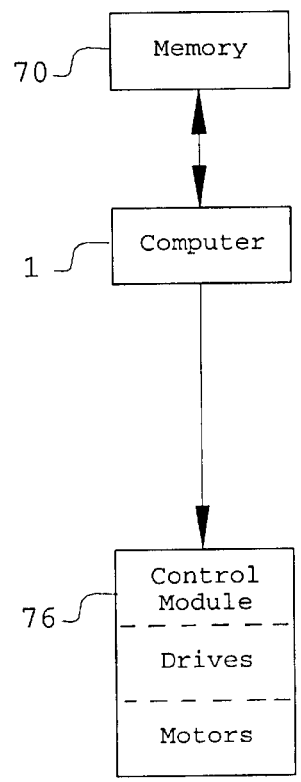
FIG. 8 shows the embodiment of the invention having the Control Module built into an integrated servo motor.

FIG. 6 shows the required hardware components of the invention: a memory 70, which consists of a solid state or standard hard drive, internally coupled to a computer 1, which is coupled, via RS232 serial network link, to the Control Module 5, coupled to servo drive 11, which powers the servo motor 16 which propels the motion system or machine tool. FIG. 7 shows the embodiment of the invention in which the Control Module is integrated within the servo drive 75. FIG. 8 shows the embodiment of the invention in which the Control Module is integrated within an integrated servo motor 76.

Figure 1:
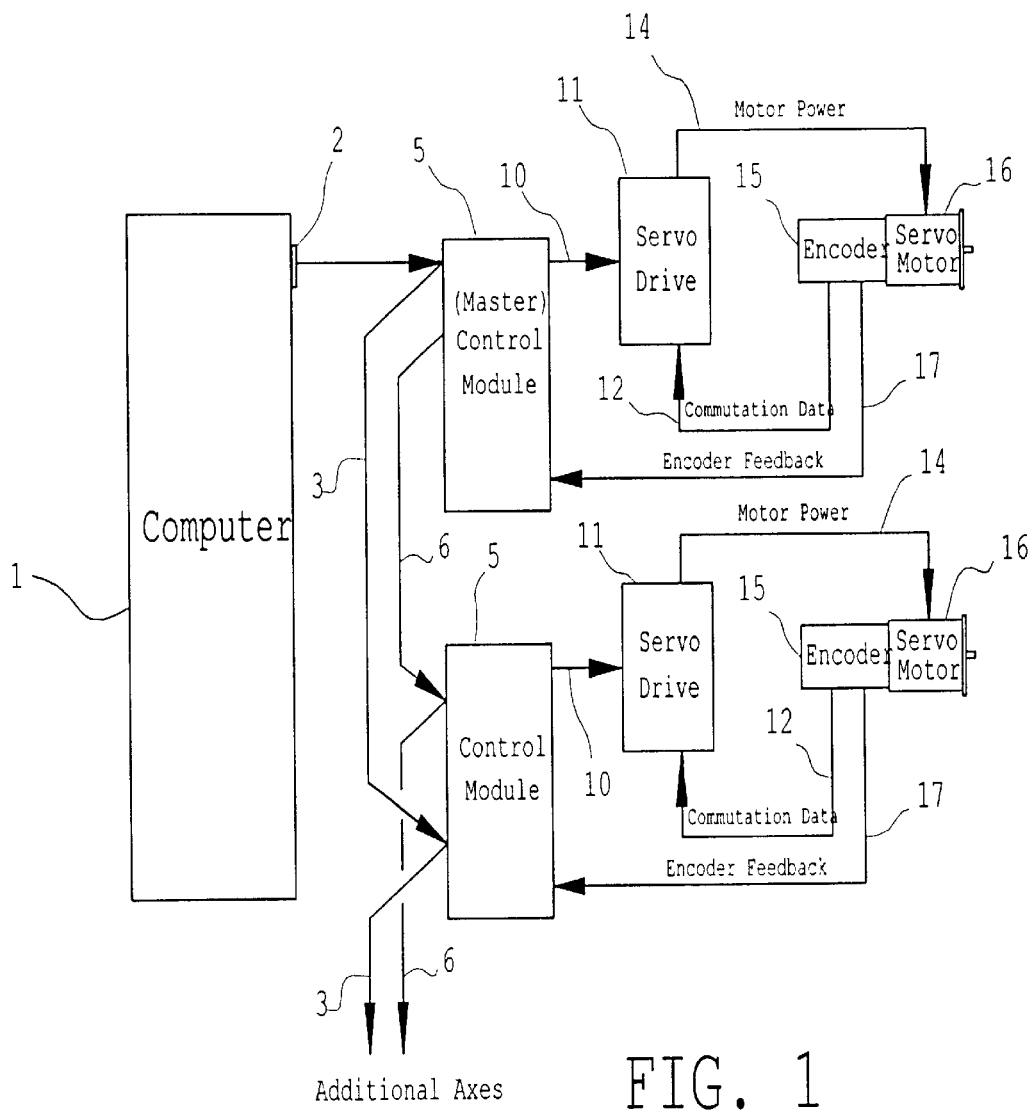
FIG. 1 shows the block diagram of the invention used with the typical servo drive/motor hardware.
Figure 1A:
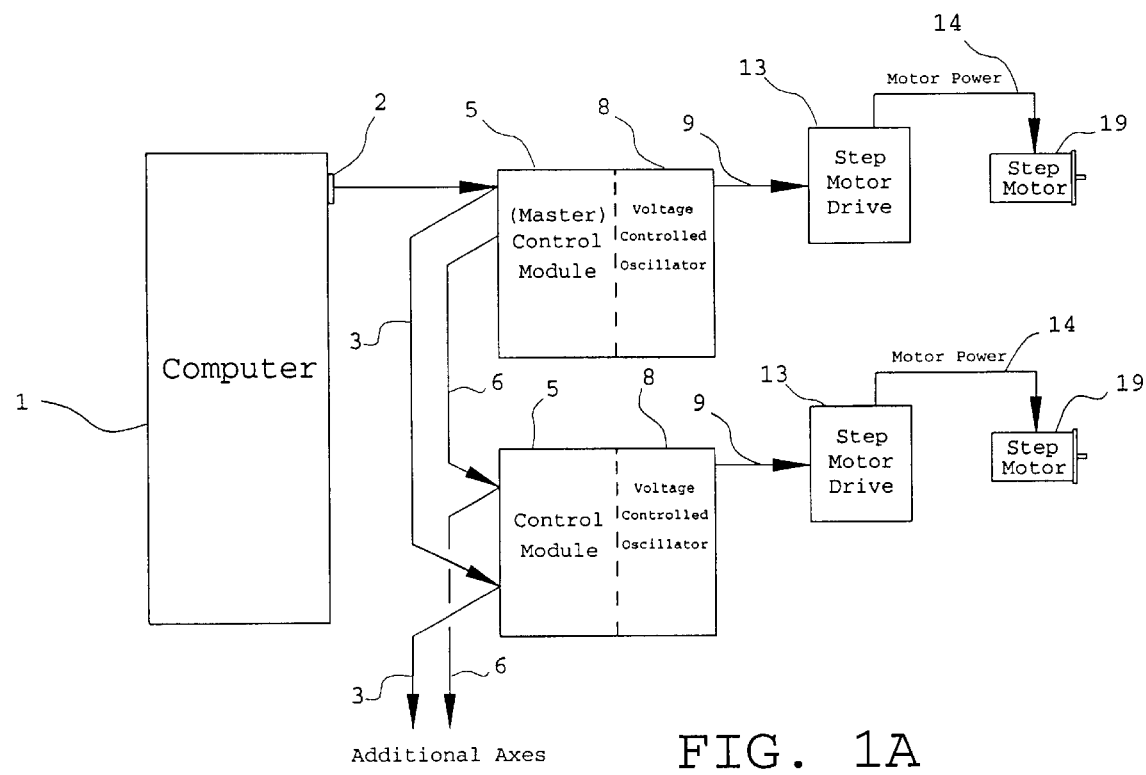

FIG. 1 illustrates the multiple axis interconnection architecture of the preferred embodiment. The typical components of the first axis represent items commercially available from many servo drive manufacturers and is essentially a generic example of the conventional art, consisting of the servo drive 11, the motor power cable 14, which provides power to the servo motor 16, the commutation data line 12, (typical in "brushless" servo technology, but not required in the older "brush" style servo systems), and the encoder feedback line 17, which provides position information to an embodiment of the invention, the Control Module 5, in this case designated as the master. This Control Module outputs a ±10 VDC analog torque/velocity signal 10, that controls the voltage/current transmitted by the servo drive to the motor. An optional feature of the invention, depicted in FIG. 1A, can include an internal voltage controlled oscillator 8 coupled to this analog output which can interface the Control Module to step motor drives 13 requiring a step and direction pulse for control of step motors 19, as opposed to the analog signal required by servo drives.

The second, of any number of additional axes, is similarly coupled. It consists of the servo drive 11, the motor power cable 14, which provides power to the servo motor 16, the commutation data line 12, and the encoder feedback line 17, which provides position information to this Control Module 5. This Control Module also outputs a ±10 VDC analog torque/velocity signal 10, that controls the voltage/current transmitted by the Servo Drive to the servo motor. The computer 1, executes the Master Control Software which includes functionality that transmits the set point control data stream through the RS232 serial port 2, to the Control Modules. This embodiment of the invention creates the individual set point command strings that make up the control data stream by using three long integer words that specify the position set point in encoder counts absolute (±2147483647), time in clock ticks (1 to 4294967295) within which that point must be crossed after the preceding point, and the time in clock ticks (1 to 4294967295) within which any acceleration required to meet the implied trajectory must be accomplished, for each axis. This is a method wherein a software function enables a computer to transmit data in a format and manner which maintains synchronized interpolated motion across a distributed motion system. At the lowest level of communication, these integer values may be represented by characters which serve to maximize serial throughput. The Control Modules are linked to the computer using a RS-485 multi-drop parallel connection method 3, which also extends to the additional axes in the motion system. A start/synchronization circuit 6, connects a digital output in the master Control Module to digital input(s) in the down line Control Modules. This is a method wherein the said means for processing a position set point data stream into synchronized interpolated trajectory control of non specialized servo and step motor drives and motors across a distributed motion system. The set point control data stream is synchronized between the distributed Control Modules, enabling interpolated motion control. Each control module is "listening" to the computer and acting upon commands sent over the multi-drop connection. As strings are being "broadcast" to all the modules, each is looking for a unique number or symbol that is their particular ID, otherwise they ignore the messages. This typical method of communicating serially with motion controllers introduces latency which will not allow precise synchronization because the commands are sent sequentially. For example: "1 do this now" "2 do this now" "3 do this now". By this example it is apparent that unit "1" will get it's command sooner then unit "3" would get the identical command. To achieve precise interpolated motion, all axes must start motion with greater synchronization then this current state of the art will allow. Therefore a method of the invention wherein interpolated motion is initiated in the precise manner required to provide the synchronization required for interpolated motion between the separate components of a distributed control network is to use a digital signal transition controlled by the control module that's configured to be the master. When it receives the serial command to begin interpolated motion, it transmits that system requirement to the other modules in the network using the digital start/synchronization circuit. This signal is a hardware processor interrupt to each module and, as such, initiates motion across the network without serial latency.

In summary, this disclosure, for first, second, and any number of additional axes, is of circuits composed of motor means including servo and step and other motor means as are recognized by those of ordinary skills in the art. Motor means as depicted herein is the combination of a drive means, including a servo drive 11, step motor drive 13 and other drives as are known to those of ordinary skill in the art; the data communication means including a motor power cable 14, which provides power to the servo or step motor 16, 19, the commutation data line 12, (typical in "brushless" servo technology, but not required in the older "brush" style servo systems), an encoder 15 and the encoder feedback line 17, which provides position information to an embodiment of the invention, the Control Module 5, designated as the master control module or control module. Where the Motor means is a servo motor 16, the Control Module 5 outputs a motor means control signal means, including, where Motor means is by servo motors 16, a ±10 VDC analog torque/velocity signal 10, that controls the voltage/current transmitted by the servo drive to the motor. Where the Motor means is by a step motor 19, the motor means control signal means is a step and direction pulse 9 generated by an internal voltage controlled oscillator 8 coupled to the Control Module 5 analog output which interfaces with the Control Module 5 to the step motor drives 13 which require a step and direction pulse 9 for control of step motors 19, as opposed to the analog signal required by servo drives.

Figure 2:
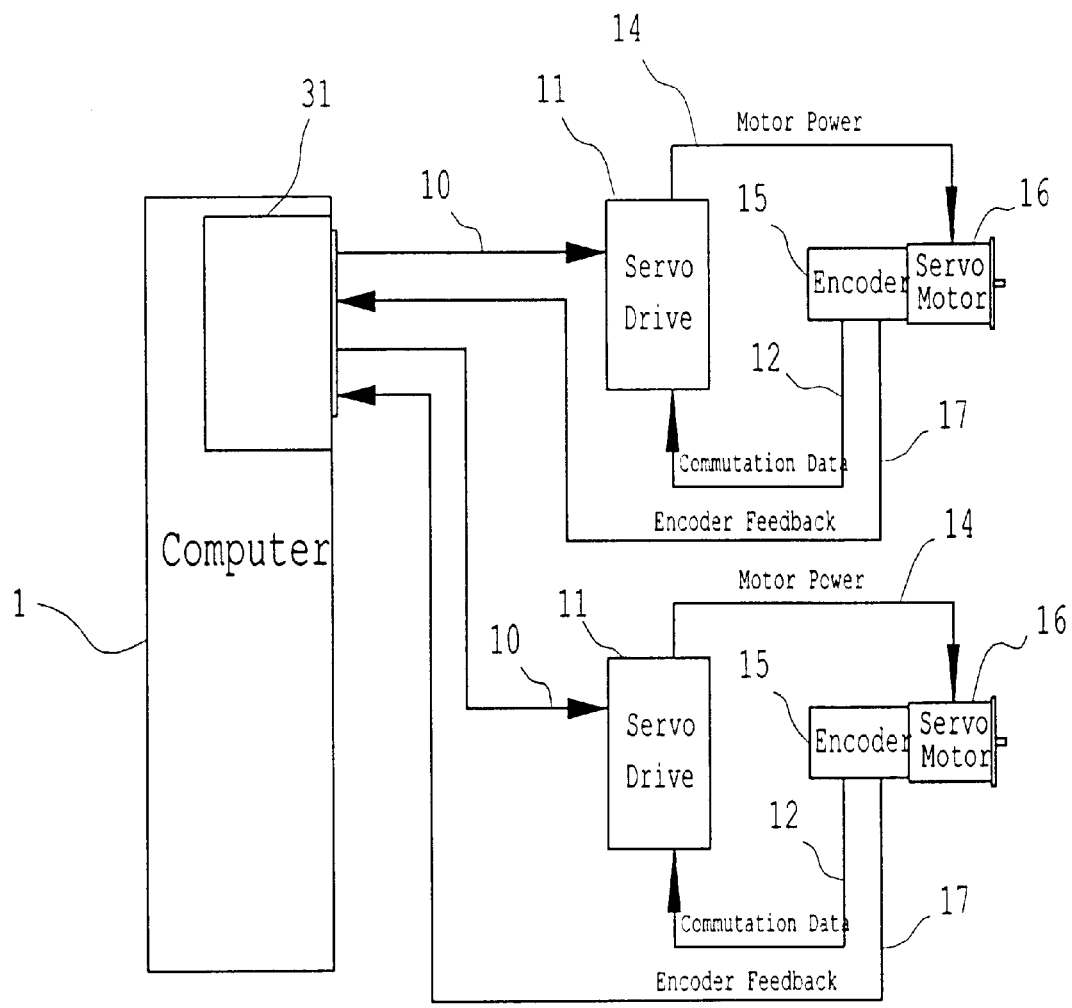
FIG. 2 shows the block diagram of a conventional add in controller board based system (prior art).

FIG. 2 illustrates the components and interconnections of the prior art add in board controller based systems which are commercially available from a variety of suppliers. They typically have a plurality of axes limited to 8, but for purposes of illustration, a two axis motion system is represented. It consists of the servo drives 11, the motor power cables 14, which provide power to the servo motors 16, the commutation data lines 12, (typical in "brushless" servo technology, but not required in the older "brush" style servo systems), and the encoder feedback lines 17, which provide position feedback information. This prior art methodology requites the encoder feedback lines be routed directly to the add in controller board 31, which is installed into a bus slot in the computer 1. The add in controller board outputs ±10 VDC analog torque/velocity signals 10, or optionally, step and direction signals which can control step motor drives (an alternative to servo drives). The user develops programs utilizing the controller board suppliers' command set or function library/DLL. This system provides interpolation functionality through the use of a central processor, unlike the feature of the invention which provides multi-processor distributed control. This prior art requires that all control, sensor, and data lines must be routed back to the computer, often passing near devices which can generate electrical noise and potential interference.

Figure 3:
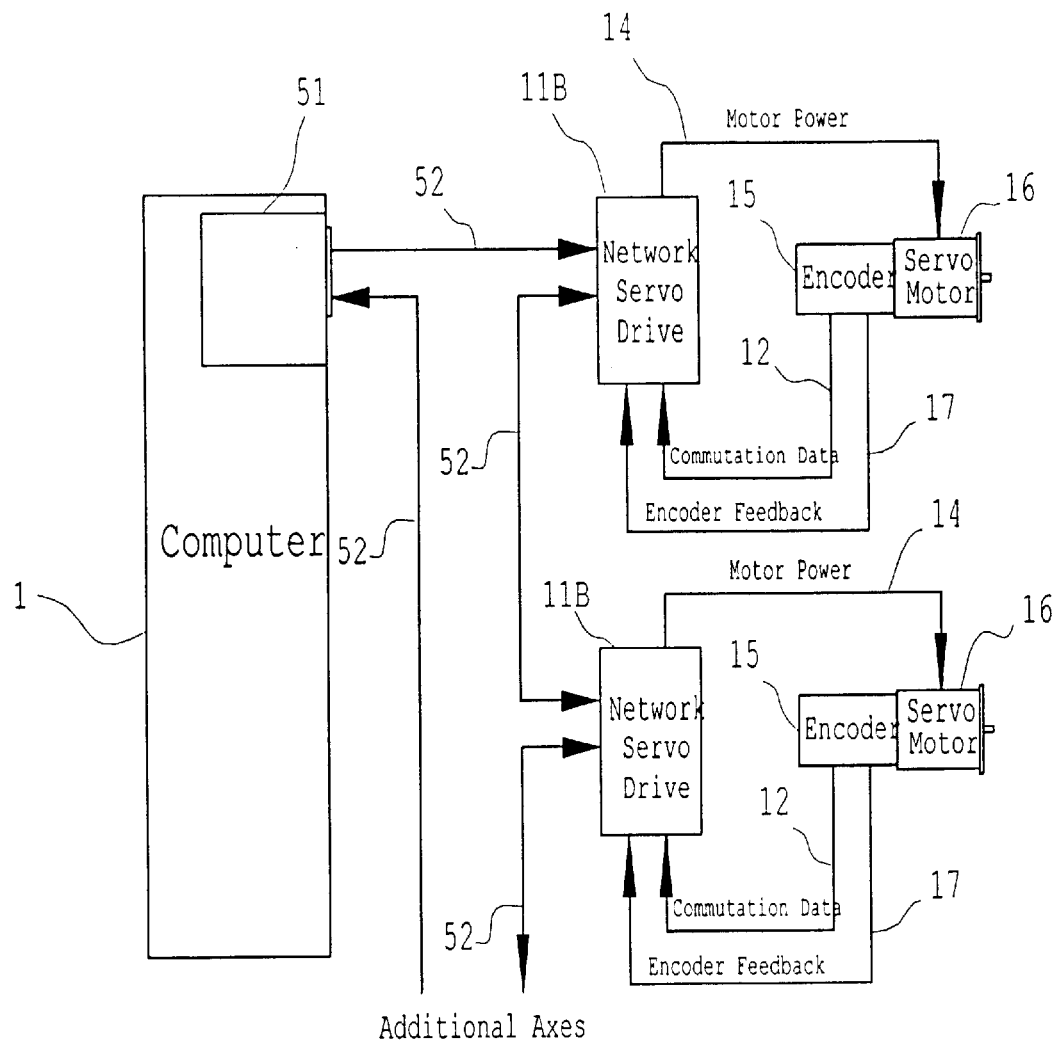
FIG. 3 shows the block diagram of a Sercos, Firewire, & MACRO network based system (prior art).

FIG. 3 illustrates the components and interconnections of the prior art network based systems able to support interpolated motion control. The network protocol most frequently utilized is either Sercos (IEC-61491), MACRO (Motion And Control Ring Optical), or Firewire (IEEE 1394). All provide determinate network control capability. They typically have a plurality of axes, but for purposes of illustration, a two axis motion system is represented. It consists of the specialized network servo drives 11B, the motor power cables 14, which provide power to the servo motors 16, the commutation data lines 12, are optional. The specialized network servo drives do not support older "brush" style servo technology or step motor drives. The encoder feedback lines 17, provide position information back to the specialized network servo drives. A network controller board 51, is required and is installed into a bus slot within a standard or specialized computer 1. Communication is established from servo drive to servo drive and back to the controller board using a "Ring" type network topology, 52. Unlike the parallel, multi-drop, method utilized by the invention, a Ring typology passes information in a "Daisy Chain" serial format. This is to say that rather then each controlled device having an independent and direct connection with the central network controller, the information is passed from device to device in a sequential pass through manner. Consequently, any servo drive having a general failure in its' communication electronics will break the network integrity and the controller will lose communication with all drives in the motion system. This is not the case with the network provided by the invention. Rather, in the case of communication failure in one servo drive, the system may enact an orderly program termination or maintain a limited alternative functionality. A determinate network requires relatively costly hardware to implement the high communication bandwidth necessary to effect positionally synchronized, or interpolated motion control. The implementation of this prior art also requires that the components itemized in FIG. 3, with the exception of the computer 1, and, in some cases, the servo motors 16, be designed specifically to utilize this network control methodology. It does not provide for an incremental hardware transition to network control because it is not compatible with the vast installed base of analog, torque, and other type digital servo drives, nor the commercially available generic types of same. Conversely, the invention does provide compatibility with this installed base and generic products and therefore provides a much reduced networked control system cost then the dominate networked methodologies available for machine tools and motion systems.

Figure 4:
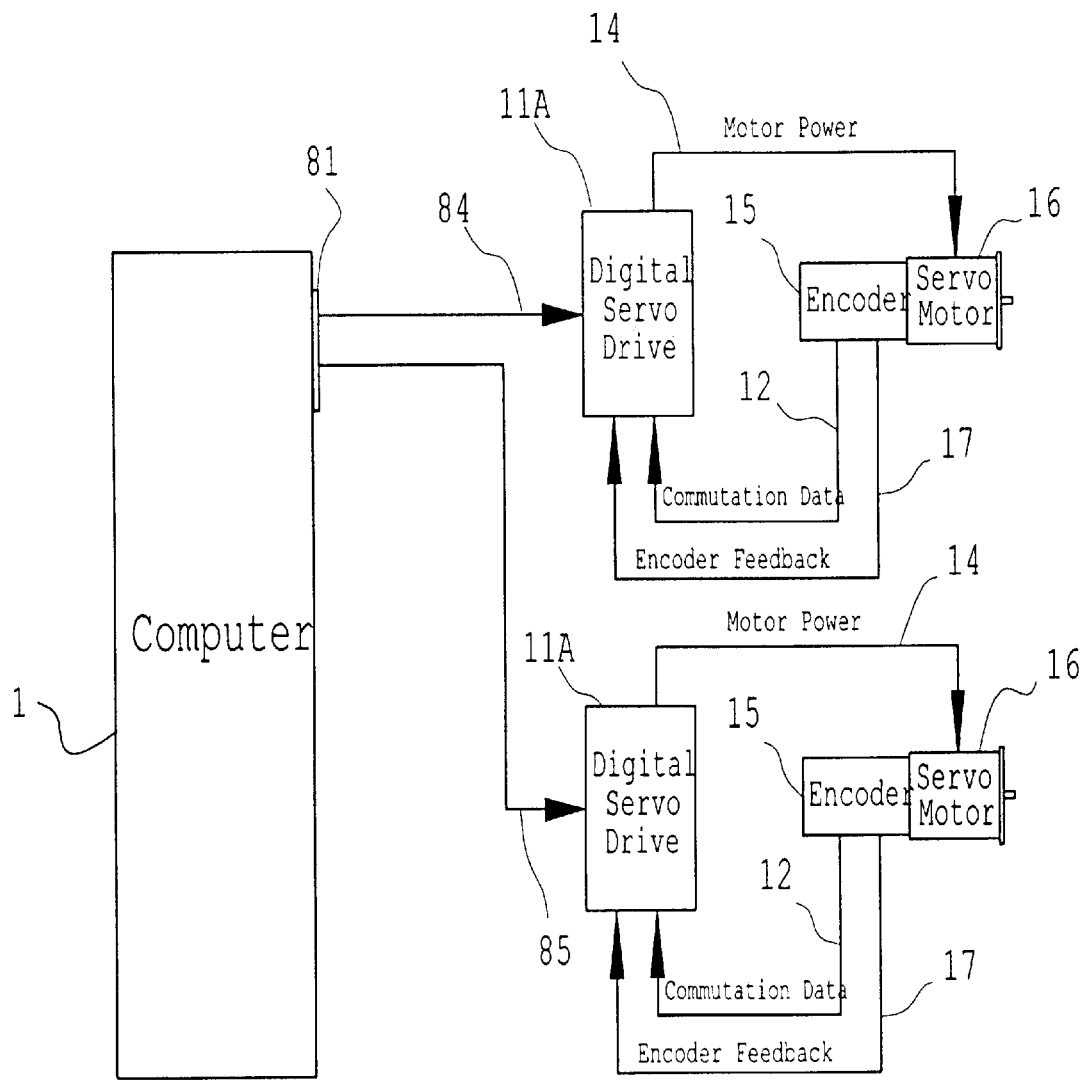
FIG. 4 shows the block diagram of a Patented prior art invention that is non conventional in nature.

FIG. 4 illustrates the hardware implementation of a control system described by U.S. Pat. No. 5,892,345 (Olsen) and U.S. Pat. No. 5,508,596 (Olsen). The computer 1, is linked to a plurality of digital servo drives 11A, using a computer parallel (printer) port 81, connected with digital parallel connections channel 1, 84 and channel 2, 85. The digital servo drives must have the internal electronics necessary to process step & direction control signals, or alternately, step motor drives are used in place of the servo drives. The remaining hardware consists of the motor power cables 14, which provide power to the servo motors 16, the commutation data lines 12, (digital step and direction drives generally do not support the older "brush" style servo systems), and the encoder feedback lines 17, which provide position information to the drives. There are many significant differences between this prior art and the invention. Foremost is the step and direction control methodology. The invention embodies the use of an "intermediate" Control Module which outputs an analog control signal and therefore does not require specialized step and direction servo drives. In addition, the invention utilizes a conventional feed back type PID based control algorithm, rather then the pre-calculated feed forward control approach used by the prior art. The invention also closes the position control loop at the Control Modules, rather then at the servo drives. The prior art accomplishes direct computer control by creating "a large data file composed of alternating bytes of information, every other byte in the file is a step byte which contains is a step byte which contain a +1, a zero, or a −1 for each axis of the machine tool" which are regulated by time delays. The embodiment of the invention that accomplishes the same creates three long integer words specifying the position set point and elapsed time values used by the Control Module to calculate the velocity and acceleration required to meet the implied trajectory in real time, for each axis. Further description of aspects of the prior art stipulate that it's "only useful for what might be called predestined motion where everything about the motion is known ahead of time". The embodiment of the invention which provides the process of streaming data into a control set point buffer also allows for the adaptation of that data to changing conditions before it enters the buffer, avoiding the necessity of only processing predestined tool paths.

Figure 5A:
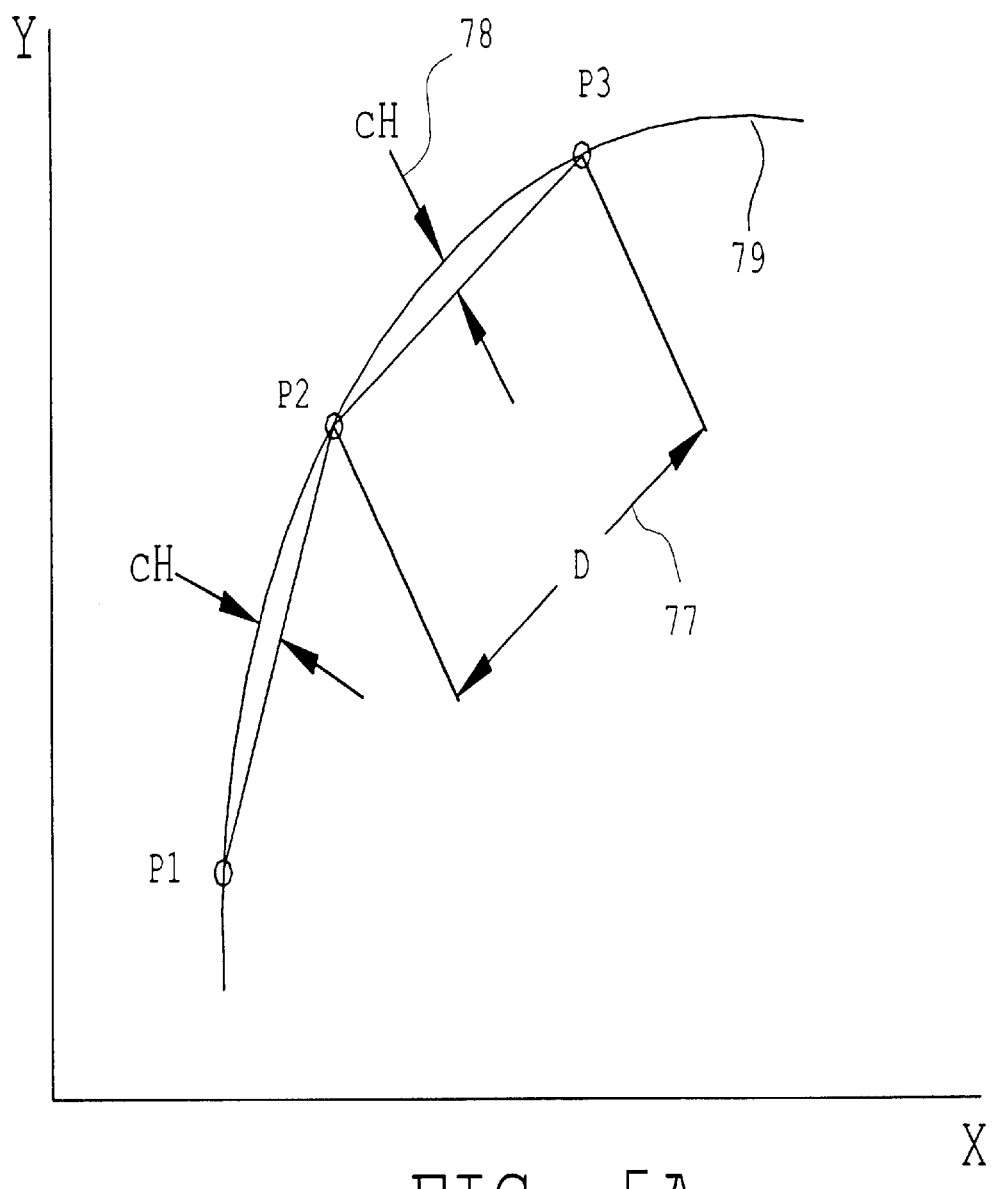
FIG. 5A shows a graph of the representative Chord Height tolerance specification which defines set point density.

FIG. 5A illustrates the inventions preferred methodology to determine the number of points derived from any given tool path, represented by the arc 79. The user specifies the Chord Height parameter 78, which is used by a Master Control Software function to calculate the initial point P2, and the subsequent point P3, using basic trigonometry, and thereby plotting the arc line segment 77. The conformance of the arc line segment to the true arc, hence the total number of line segments which programmatically determine the actual motion path, is controlled by the value of the chord height parameter, typically between 0.0001" and 0.002". This process specifies coordinate data points which define the path of two (or more) servo axes as a stream of position set points consisting of any integer number of encoder counts. These set points may represent an absolute position relative to coordinate origin, or alternately, they represent an incremental distance from the previous set point specification. By using the vector feed rate and acceleration specified in the path program file, a Master Control Software function computes the elapsed time from the passing through of the previous point to the completion of (if required) the acceleration towards the second point and the total elapsed time the second point must be passed through by each axis. This is the process to specify, for each position set point a value, expressed in clock ticks, of a specific elapsed time the exact transition of which determines when the trajectory acceleration must be accomplished. And in addition, the process to specify for each position set point a value, expressed in clock ticks, of a specific elapsed time the exact transition of which determines when the set point position must be reached or crossed. The mathematics used to implement the processes just described are known by most engineering students, and are not a subject of the invention. Therefore they are not being detailed here.

This is the method wherein information required to process a data stream of set points, able to maintain synchronized interpolated motion, is formatted for transmittal over a serial network. This method can be applied to more then two axes, but using two as an example (axis 1 and axis 2), the command string sent by the appropriate Master Control Software function to the Control Modules would be:

"1 $X_1$ $TA_x$ $ET_1$ 2 $Y_1$ $TA_y$ $ET_1$"

where:
1=Unique X axis identifier
2=Unique Y axis identifier
$X_1$=X axis absolute coordinate position (or incremental distance)
$Y_1$=Y axis absolute coordinate position (or incremental distance)
$TA_x$=X axis acceleration time
$TA_y$=Y axis acceleration time
$ET_1$=total segment motion time for the given point segment The elapsed time ($ET_n$) of any point command specification is the same for each member of that point, but may be different for subsequent points, depending on the curve of the path arc. In order to blend arc line segment 77 with a subsequent segment, the value of $ET_1$ reflects the reduction required to share the acceleration transition with the subsequent segment. $TA_x$ & $TA_y$ are calculated based upon the vector velocity specified in the path program file and define the time required to reach the velocities derived for each axis. In order to maintain synchronization during acceleration both $TA_x$ & $TA_y$ are set equal to the greater of the two. Both provisions also apply to velocity based $X_1$ & $Y_1$ segmentation explained below.

An alternative embodiment of the invention would be to use velocity based $X_1$ & $Y_1$ segment values in place of the positional definitions to maintain position control as a derivative of motion segment time, $Et_n$:

$X_1$=X axis velocity to be maintained during motion
$Y_1$=Y axis velocity to be maintained during motion
$TA_x$=X axis acceleration time to velocity $X_1$
$TA_y$=Y axis acceleration time to velocity $Y_1$
$ET_1$=total segment motion time for the given velocity segment The process of acquiring the path set point position specifications is the same as the description for FIG. 5 explained above. However, motion to reach that position is controlled for each axis by maintaining the vector velocity and acceleration specified in the path program file for the time required ($ET_1$) to traverse the distance derived from the path set points. These factors are used to calculate acceleration times, $TA_x$ & $TAy$, and individual axis velocities, $X_1$ & $Y_1$. This is the process which specifies velocity data points which define the path of two (or more) servo axes as a stream of velocity set points consisting of any integer number of encoder counts per clock tick units. In addition, it is the process which specifies for each velocity set point a value expressed in clock ticks of a specific elapsed time the exact transition of which determines when the velocity acceleration must be accomplished. And further, a process which specifies for each velocity set point a value expressed in clock ticks of a specific elapsed time the exact transition of which determines when the set point velocity must transition to the next velocity set point. The mathematics used to implement the processes just described are known by most engineering students, and are not a subject of the invention. Therefore they are not being detailed here.

As soon as two point command strings are derived from the geometry defined by the path program file it becomes possible to start motion. A function of the Master Control Program provides for the continuous transmission of subsequent points into the buffer of the Control Module as required to maintain the path trajectory. The buffer may be filled with hundreds of points to be stored in a queue until needed by the Control Module, or metered out as needed. Although the total motion time specified for a given segment is the same across the network for any given set of points, it is unlikely that the interpolated motion will remain synchronized after it begins due to the minor variance typical of micro processor internal timing clocks such as those internal to each, separate, control module. Therefore it is necessary that a method be utilized which will compensate for that this clock "drift". A method wherein interpolated motion synchronization is maintained across a non deterministic distributed network using pulsed digital signal transitions. Specifically, the digital circuit used to initiate motion is strobed on and off by the designated master control module during motion. The receiving control modules process these transitions in a manner which normalizes their clock count against the masters', thereby maintaining synchronization across the network.

Figure 5B:
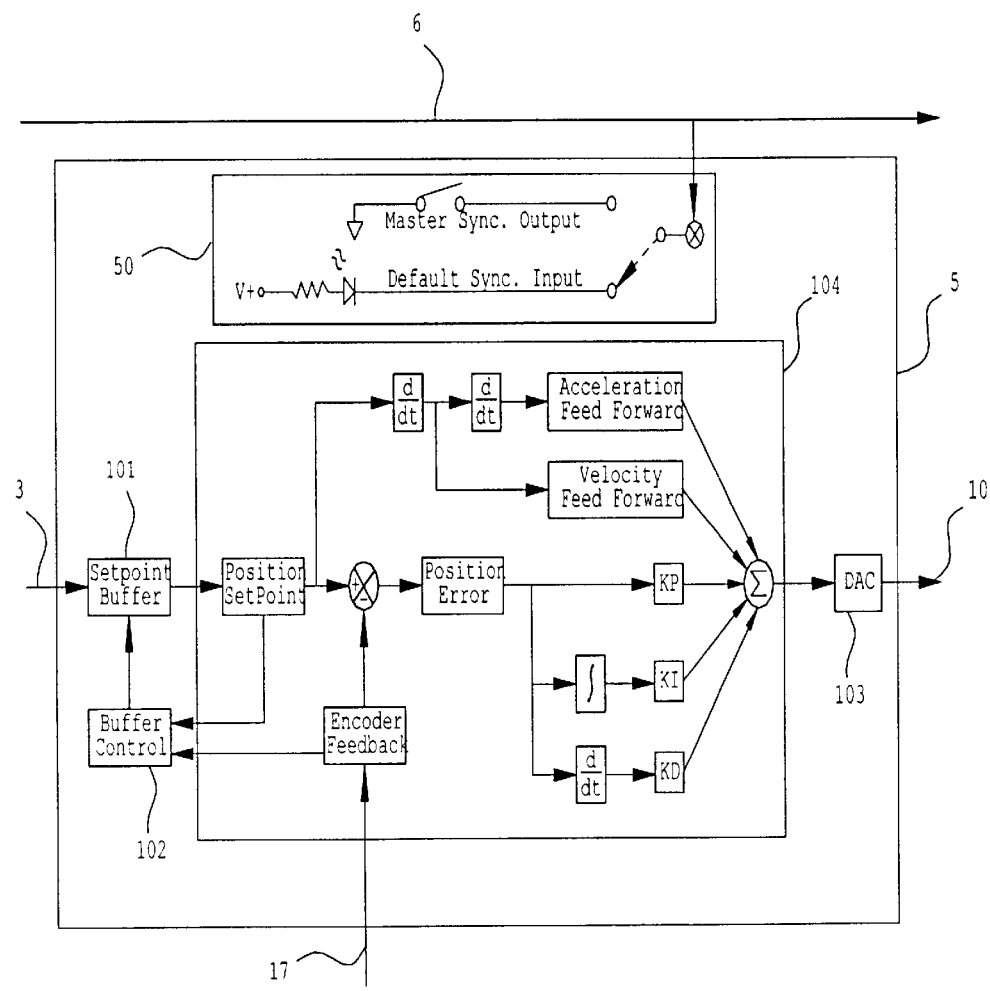
FIG. 5B shows the block diagram of the Control Module.

FIG. 5B is a block diagram of the Control Module 5, the apparatus which provides the means for processing a position set point data stream into synchronized interpolated trajectory control of non specialized servo and step motor drives and motors across a distributed motion system. The preferred embodiment is a DSP based unit which implements a type of PID position compensator which is in wide industrial use today 104. The set point command data stream is transmitted via an RS-485 multi-drop parallel connection 3, into the Set Point Buffer 101, and is metered into the position loop by the buffer control 102. This is the apparatus and method wherein a memory buffer within the distributed control module is used in a manner which compensates for the indeterminate nature of a computers' operating system as it relates to controlling interpolated motion. In addition, This is the apparatus and method wherein a memory buffer within the distributed control module is used in a manner which compensates for the indeterminate nature of a low bandwidth serial network as it relates to controlling interpolated motion.

Encoder feedback 17, comes from the servo motors' encoder and the PID output is converted to an analog signal by the digital to analog converter 103. This signal is sent to the servo drives as an analog torque or velocity command 10. Synchronization required for the interpolated execution of the set point command data stream is provided by a digital Sync Circuit 50, and digital I/O circuit 6. This high speed digital circuit connects all the control modules together. The default control module I/O configuration is "Sync Input" and the control module designated as the "Master" has its' I/O configured as a "Sync Output". The master receives the start motion signal from the computer through the serial network and then transmits a start signal to the other control modules using the faster digital I/O synchronization circuit. This represents the apparatus wherein the means for controlling a digital signal transition in a manner which initiates and maintains synchronized interpolated motion across a distributed motion system. In addition, it's a method wherein digital Input and Output processing within the distributed control module(s) is used in a manner which compensates for the indeterminate nature of a low bandwidth serial network as it relates to controlling interpolated motion.

I claim:

1. A method for using a computer for controlling the interpolated motion of automated machine tools, industrial robots, and other motion control systems having a plurality of axes, over a non deterministic serial network, comprising:

A. inputting into a computer a Master Control Program;

B. specifying coordinate data points which define a path of at least two Motor means axes; inputting into the computer and Master Control Program the specified coordinate data points;

C. executing the Master Control Program and generating from the Master Control Program a control set point data stream; outputting from the computer and Master Control Program the control set point data stream to one or a plurality of control modules (5);

D. outputting from the one or a plurality of control modules one or a plurality of motor means control signal means to one or a plurality of motor means.

E. the coordinate data points composed of a stream of position set points or of a stream of velocity set points of any integer number of encoder counts.

F. motor means provided by servo or step motors; drive means provided by a servo drive (11) or a step motor drive (13);

G. a motor data communication means provided by a motor power cable (14), providing power to the one or a plurality of servo or step motors (16),(19);

H. the motor means control signal means, including, where Motor means is by servo motors (16), a+/−10 VDC analog torque/velocity signal (10), that controls the voltage/current transmitted by the servo drive to the motor; where the Motor means is by a step motor (19), the motor means control signal means is a step and direction pulse (9) generated by an internal voltage controlled oscillator (8) coupled to the Control Module (5) analog output which interfaces with the Control Module (5) to the step motor drives (13) which require a step and direction pulse (9) for control of step motors (19);

I. memory or buffer means composed of a Set Point Buffer (101), and memory or buffer control means is by a buffer control (102);

J. outputting the control set point data stream via an RS-485 multi-drop parallel connection (3);

K. each of the one or a plurality of motor means composed of the combination of a drive means, a motor data communication means, a motor, a commutation data line 12, an encoder (15) and an encoder feedback line (17);

L. inputting the encoder feedback line (17) to the Control Module 5; the one or a plurality of control modules (5) having memory or buffer means and memory or buffer control means.

2. The method of claim 1 further comprising:

A. the Master Control Program having a Master Control Software function; the control set point data stream sent by the Master Control Software function, where positional values are used, is: "$1X_1TA_xET_12\ Y_1TA_yET_1$" where:
- 1=Unique X axis identifier
- 2=Unique Y axis identifier
- $X_1$=X axis absolute coordinate position (or incremental distance)
- $Y_1$=Y axis absolute coordinate position (or incremental distance)
- $TA_x$=X axis acceleration time
- $TA_y$=Y axis acceleration time
- $ET_1$=total segment motion time for the given point segment B. where coordinate data points are composed of a stream of position set points, specifying for each position set point a value, expressed in clock ticks, of a specific elapsed time the exact transition of which determines when a trajectory acceleration must be accomplished; specifying for each position set point a value, expressed in clock ticks, of a specific elapsed time the exact transition of which determines when a set point position must be reached or crossed;

C. memory or buffer means composed of a Set Point Buffer (101), and memory or buffer control means composed of a buffer control (102).

3. The method of claim 1 further comprising:

A. the Master Control Program having a Master Control Software function; the control set point data stream sent by the Master Control Software function, where velocity based segment values are used, is "$X_1TA_xET_1Y_1TA_yET_1$" where
- $X_1$=X axis velocity to be maintained dining motion
- $Y_1$=Y axis velocity to be maintained during motion
- $TA_x$=X axis acceleration time to velocity $X_1$
- $TA_y$=Y axis acceleration time to velocity $Y_1$
- $ET_1$=total segment motion time for the given velocity segment B. where coordinate data points are composed of a stream of velocity set points consisting of any integer number of encoder counts per clock tick units; specifying from each velocity set point a value expressed in clock ticks of a specific elapsed time the exact transition of which determines where the velocity acceleration must be accomplished; specifying for each velocity set point a value expressed in clock ticks of a specific elapsed time the exact transition of which determines when the set point velocity must transition to the next velocity set point; inputting into the computer and Master Control Program the specified velocity data points;

C. memory or buffer means composed of a Set Point Buffer (101), and memory or buffer control means composed of a buffer control (102).

4. An apparatus in accordance with claim 2 wherein the said means for controlling a digital signal transition in a manner which initiates and maintains synchronized interpolated motion across a distributed motion system.

5. An apparatus in accordance with claim 3 wherein the said means for controlling a digital signal transition in a manner which initiates and maintains synchronized interpolated motion across a distributed motion system.

6. An apparatus in accordance with claim 2, wherein information required to process a data stream of set points and to maintain synchronized interpolated motion, is formatted for transmittal over a serial network.

7. An apparatus in accordance with claim 3 wherein information required to process a data stream of set points and to maintain synchronized interpolated motion, is formatted for transmittal over a serial network.

8. An apparatus in accordance of claim 2 wherein a micro processor based control module processes a position set point data stream for synchronized trajectory control of non specialized servo and step motor drives and motors across a distributed motion system.

9. An apparatus in accordance of claim 3 wherein there is there is means for processing a velocity set point data stream into synchronized velocity control of non specialized servo and step motor drives and motors across a distributed motion system in a manner which maintains interpolated motion.

10. An apparatus in accordance of claim 3 wherein a micro processor based control module processes a velocity set point data stream for synchronized velocity control of non specialized servo and step motor drives and motors across a distributed motion system in a manner which maintains interpolated motion.

11. An apparatus in accordance of claim 1 where in a voltage controlled oscillator is coupled in a manner to the analog control signal of the distributed control module that enables step motor drives to be controlled, in place of servo drives.

* * * * *